Figure 3:
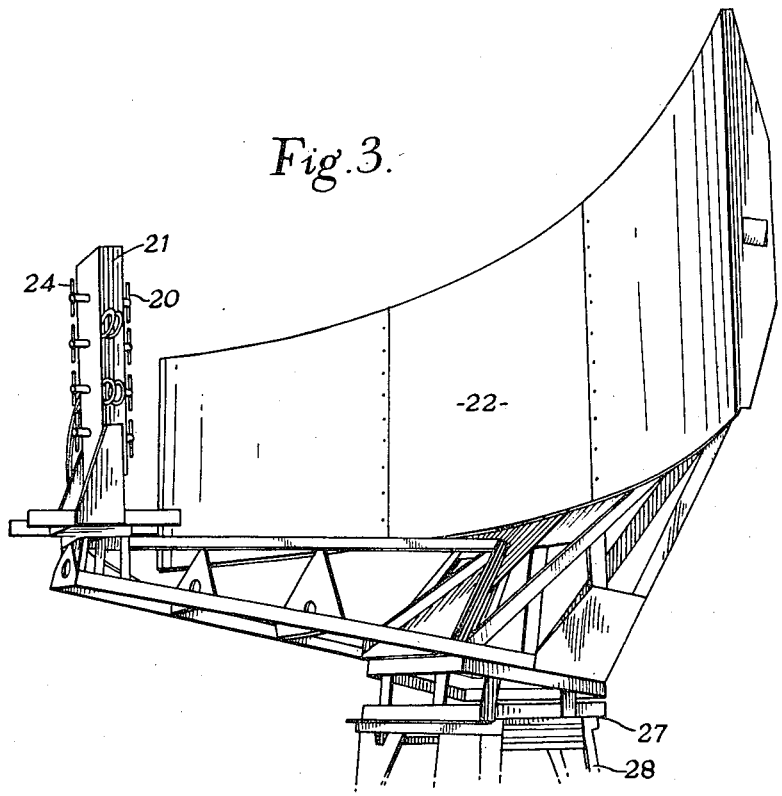

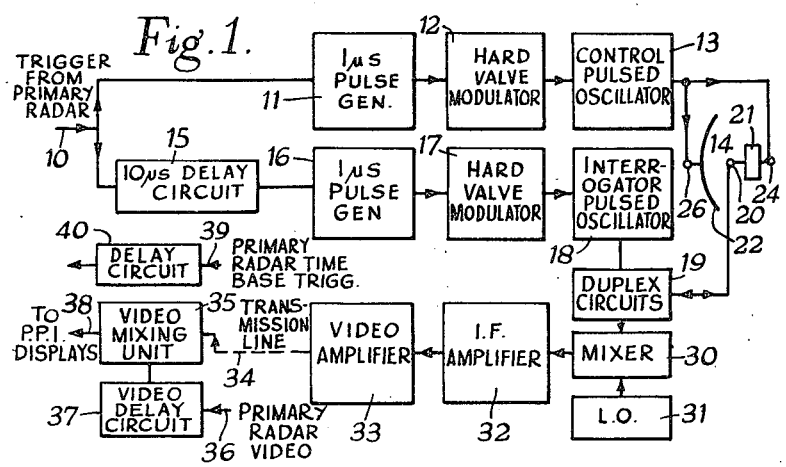
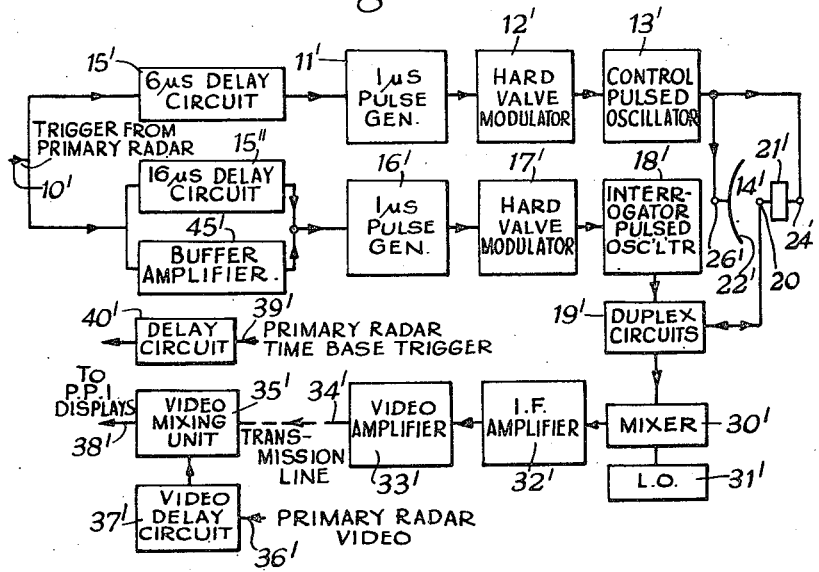

Feb. 18, 1958   D. A. LEVELL ET AL   2,824,301
SECONDARY RADAR SYSTEMS
Filed May 1, 1953   5 Sheets-Sheet 2

INVENTORS
Derek A. Levell
Kennyth E. Harris
BY
Ralph B. Stewart
ATTORNEY

INVENTORS
Derek A. Levell
Kenneth E. Harris
BY
Ralph B. Stewart
ATTORNEY

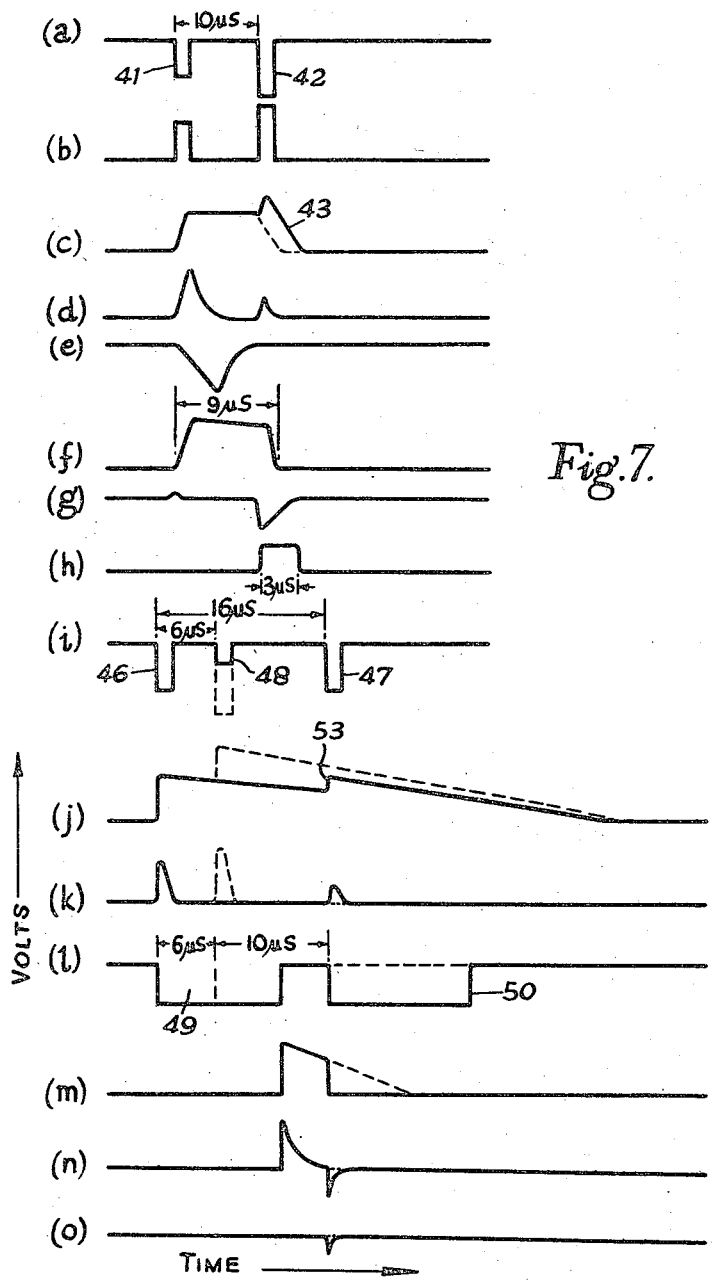

United States Patent Office 2,824,301
Patented Feb. 18, 1958

2,824,301

SECONDARY RADAR SYSTEMS

Derek Alfred Levell, West Hendon, London, and Kennyth Ernest Harris, New Barnet, England, assignors to A. C. Cossor Limited, Highbury Grove, London, England, a British company Application May 1, 1953, Serial No. 352,322

Claims priority, application Great Britain May 9, 1952

4 Claims. (Cl. 343—6.5)

The present invention relates to secondary radar systems, that is to say systems in which pulses transmitted from a first station serve to trigger a transmitter at a second station, the latter transmitter then transmitting a signal which can be received at the first station. It will be assumed, for convenience, that the first station is a ground station and that the second station is in an aircraft, although the invention is not limited to such arrangements.

The purpose of such a system is to enable the ground station to identify an aircraft and it is a requirement that the direction from the ground station of an aircraft which responds to a signal transmitted from the ground station should be capable of being ascertained and linked up with an indication from an associated primary radar system. For this purpose it is necessary that the interrogating pulses from the ground should be transmitted from a directional aerial system which is rotated around a circle or at least over an arc. The main lobe of a directional aerial is necessarily accompanied by side lobes which for a responding aircraft within their range give rise to an ambiguity as to the direction of the aircraft.

In order to reduce this disadvantage it has been proposed to radiate from the ground station, in addition to the directional transmission, a further transmission which has, in all directions, an intensity intermediate that of the main and side lobes of the directional transmission, the sensitivity of the airborne receiver being controlled by the further transmission. In this known arrangement there is no fixed time relation between the said directional and further transmissions and the sensitivity control of the airborne receiver is given a long time constant, for example of the order of the pulse recurrence period or even the period of rotation of the aerial system.

A further disadvantage that has been met with is that of preventing capture of the airborne equipment, usually known as a transponder, when a number of ground stations are attempting to interrogate the airborne equipment at the same time. In order to reduce this disadvantage it has been proposed to transmit from the directional aerial pairs of interrogating pulses having a predetermined time-separation which is small compared with the recurrence period of the pairs. Thus, during the relatively long intervals between successive interrogations of an airborne equipment by one ground station, other ground stations can interrogate, and obtain a response from, the equipment.

The present invention has for its principal object to provide a secondary radar system in which both the above-mentioned disadvantages can be reduced simultaneously.

According to the present invention, there is provided, for use in a secondary radar system, an interrogating transmitter comprising means for generating pairs of pulses of radio-frequency energy of a predetermined time spacing which is small compared with the recurrence period of the pulse pairs, a circuit for applying the pulses of each pair to separate transmitting aerials, that to which the second pulse of each pair is applied being a directional aerial which in operation is rotated (continuously in one direction or to and fro over an arc), and the arrangement being such that the energy radiated in response to the first pulse of each pair is, in all directions, intermediate that radiated in the main and side lobes of the directional aerial. The aerial to which the first pulse of each pair is applied is preferably an approximately omni-directional aerial.

A transponder for use in the secondary radar system according to the invention is provided with a circuit responsive to the second pulse of a pair of pulses, when such pulse has a predetermined amplitude relation to the first pulse of the pair and occurs within predetermined limits of time after the first pulse of the pair, to trigger the transmitter of the transponder. The said circuit is preferably given a short time constant such that it is in a condition to respond to further interrogation very soon after the reception of the second pulse in one interrogation.

The interrogating transmitter according to the invention as set forth using only recurrent pairs of pulses has the limitation that the maximum range from an associated transponder at which it will operate the transponder is determined by the range at which the first pulse of each pair can be effective. This range is, of course, less than that at which the pulses from the directional aerial can be effective.

In order to overcome this limitation, in a modification of the interrogating transmitter according to the invention the said first pulse of each pair is preceded, at a predetermined time interval, by a further pulse which is applied to the directional aerial. For ranges less than the effective range of the centre pulse of each set, this centre pulse is effective in preventing undesired responses due to side lobes of the directional aerial and, nevertheless, the maximum range of the system can be made that of the pulses radiated from the directional aerial.

One of the two aerials, preferably the directional aerial, may be arranged to operate also as a receiving aerial for receiving signals radiated by the transponder.

The means for generating the pairs of pulses are preferably arranged to be triggered by pulses generated for search purposes by an associated primary radar system, and a common cathode ray tube or other presentation device may be provided to display the primary radar echoes and the signals from a transponder.

Figure 4:
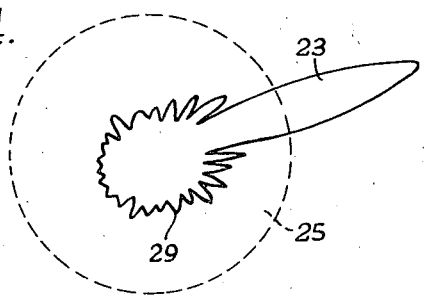
Figure 5:
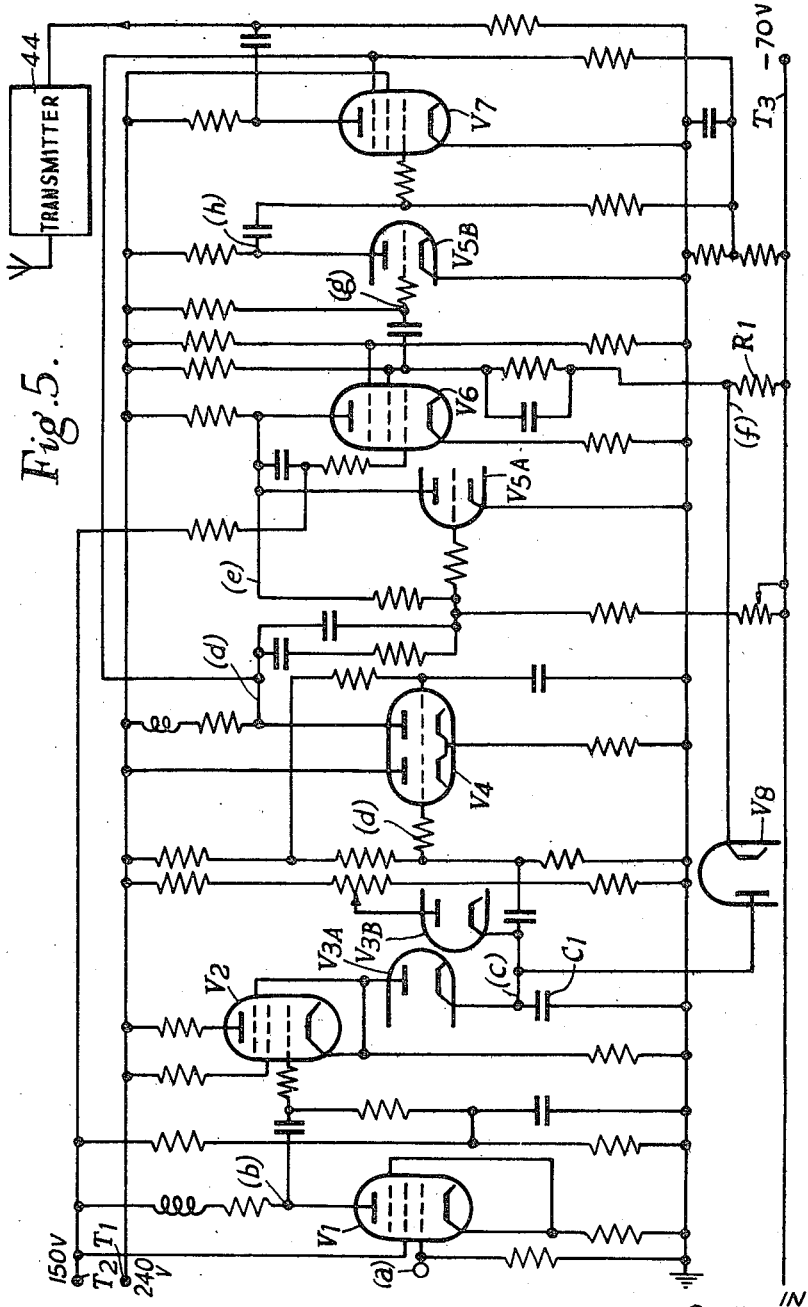
Figure 6:
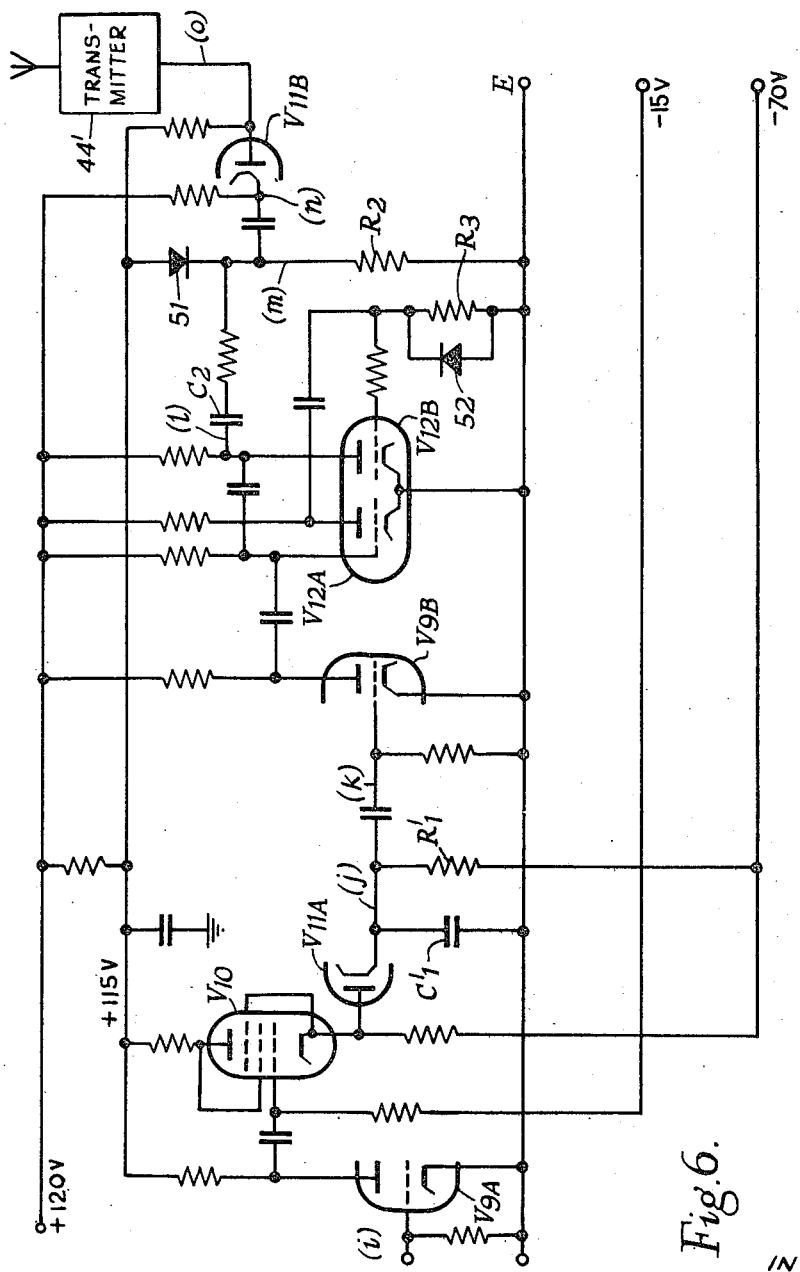

Other features of the invention will be apparent from the following description, which is given by way of example, with reference to the accompanying drawings in which Figs. 1 and 2 are block circuit diagrams of two interrogating transmitters according to the invention, Fig. 3 is a perspective view of an aerial system for use with the transmitters of Figs. 1 or 2, Fig. 4 is an approximate horizontal polar diagram of the aerial system of Fig. 3, Figs. 5 and 6 are circuit diagrams of transponders particularly adapted for use with the transmitters of Figs. 1 and 2 respectively, and Fig. 7 contains somewhat idealised waveforms occurring in various parts of the circuits of Figs. 5 and 6, the waveforms (a) to (h) relating to the circuit of Fig. 5 and the waveforms (i) to (o) relating to the circuit of Fig. 6. The points in the circuits of Figs. 5 and 6 where the individual waveforms occur are identified in those Figures by the letters of the waveforms in Fig. 7.

Referring to Fig. 1, a primary radar transmitter (not shown) sends out pulses for search purposes, the generation of each such pulse serving to apply a triggering pulse at 10 to a pulse generator 11 which then generates a pulse of 1 μs. duration The recurrence period of the pulses may, for example, be between 2000 and 4000 μs. These pulses are fed to a hard valve modulator 12 which modulates a control pulsed oscillator 13 and the pulses of radio-frequency energy from this oscillator are fed to an aerial system 14 to be described later.

The triggering pulses at 10 are also applied through a delay circuit 15, giving in this example a delay of 10 μs., to trigger a second generator 16 of pulses of 1 μs. duration which are applied to a second hard valve modulator 17 modulating an interrogator pulsed oscillation generator 18 which feeds pulses of radio frequency energy through duplex circuits 19 to the aerial system 14. The two oscillators 13 and 18 may be controlled from a common crystal oscillator with the aid of a suitable automatic frequency control device, although these parts are not shown, thereby ensuring that the oscillators 13 and 18 operate at the same radio frequency.

The aerial system 14 is shown in perspective in Fig. 3 and in a diagrammatic plan view in Fig. 1. The interrogating aerial to which the energy from the interrogating pulsed oscillator 18 is applied comprises an array of dipoles 20, in this example four in number, mounted in a vertical line upon the rear face of a metal box 21 which acts as an aperiodic reflector. A curved reflector 22 serves to direct most of the energy into a main lobe 23 as shown in Fig. 4. The control aerial to which the energy from the control pulsed oscillator 13 is applied comprises a second array of dipoles 24, in this example also four in number, mounted in a vertical line upon the front face of the metal box 21. In order to obtain, from the control aerial, an approximately uniform radiation in all directions as shown at 25 in Fig. 5, a second dipole 26 is arranged on the rear of the reflector 22 and this dipole is fed with a suitable small amount of power from the control pulsed oscillator 13.

The aerial system is mounted, as shown in Fig. 3, upon a turntable 27 which is rotated by means not shown upon a supporting structure 28.

The directional aerial also radiates side lobes 29, as shown in Fig. 4, and it is arranged that the energy radiated by the control aerial, represented by 25, is in all directions intermediate that in the main lobe 23 and the side lobes 29.

It will be evident that, owing to the effect of the delay circuit 15, there will be radiated from the aerial system 14 pairs of pulses spaced apart in time by 10 μs., a time which is small compared with the recurrence period of the pairs of pulses, which, as stated, may be between 2000 and 4000 μs. The first pulse of each pair is radiated from the approximately omni-directional aerial and the second pulse of each pair is radiated from the directional aerial.

In this example the directional aerial is used also as a receiving aerial to receive signals radiated by a transponder when triggered by the pairs of pulses radiated from the ground station. This is the purpose of the duplex circuits 19. Received signals after mixing in a mixer 30 with oscillations from a local oscillator 31 are applied to an intermediate frequency amplifier 32 and thence to a video amplifier 33, the output of which is connected through a transmission line 34 to a video mixing unit 35 which may be at a distance from the remainder of the equipment so far described.

Signals received by the associated primary radar system are applied at 36 to a video delay circuit 37 which is connected to the mixing unit 35. The delay introduced by the circuit 37 is made equal to the delay introduced by the circuit 15 together with the delays occurring elsewhere including the transponder, the arrangement being such that the signal corresponding to a primary radar echo from a given target and the signal from a transponder at the same target occur simultaneously in the mixing unit 35. The output 38 of the mixing unit 35 is applied to a common display device, such as a P. P. I. tube, for the primary and secondary radar systems. The primary radar time base triggering voltage is applied at 39 through a delay circuit 40, introducing the same delay as the circuit 37, to the P. P. I. tube.

Reference will now be made to the transponder circuit shown in Fig. 5 together with the waveforms shown in Fig. 7(a) to (h).

One pair of pulses radiated as described is received at the transponder and give rise to the pulses 41 and 42 of Fig. 7(a), the pulse 41 being that received from the control aerial of Fig. 1 and the pulse 42 being that received from the interrogating aerial; the latter is, therefore, as shown, of larger amplitude than the former. The pulses 41 and 42 are applied through a suitable circuit, such as a logarithmic intermediate frequency amplifier, to a pentode valve V1, which may be a CV138 valve. The inverted waveform shown in Fig. 7(b) is applied to a cathode follower pentode V2, which may be an EL81 valve, having in its cathode circuit a storage capacitor C1. A diode V3A, which may be one half of a CV140 valve, is connected between the capacitor C1 and the cathode of the pentode V2. Another diode V3B, which may be the other half of the CV140 valve, determines the minimum value at which the diode V3A conducts. The anode of V2 is connected to a positive supply terminal T1 at 240 volts, the anode of V1 is connected to a positive supply terminal T2 at 150 volts, and a supply rail T3 is maintained at minus 70 volts.

The pulse 41 charges the capacitor C1 and the rise in voltage occuring during this charging is amplified by a cathode-coupled valve V4, which may be a CV858 valve, and applied through an anode follower clamp valve V5A, which may be one half of a CV858 valve, to trigger a phantastron V6, which may be a CV329 valve. When triggered, the phantastron generates at its screen grid a positive, approximately rectangular pulse as shown in Fig. 7(f) having a duration a little less than the delay time between the pulses 41 and 42. The duration of the pulse of Fig. 7(f) is shown as 9 μs. and the pulse is used, as will be described later, to prevent the discharge of the capacitor C1 throughout its duration.

The termination of the rectangular pulse at the screen grid V6 produces, through a shaping circuit connected to the control grid of a valve V5B, which may be the other half of the CV858 constituting V5A, a shorter, approximately rectangular, positive pulse, for example of 3 μs. duration, as shown in Fig. 7(h) which is applied to a gating valve V7 to open this valve for the duration of the pulse.

The pulse of Fig. 7(f) generated at the screen grid of V6 is applied to the cathode of a diode V8, which may be one half of a CV140 valve, and renders this diode insulating, thus preventing discharge of the capacitor C1 for the duration of the pulse. The charge on C1 is, therefore, held at the value produced by the pulse 41. If the second pulse 42 does not occur, at the end of the pulse of Fig. 7(f) the capacitor C1 discharges as indicated by the broken line in Fig. 7(c). If the second pulse 42 occurs as the discharge of C1 begins or at least before it has proceeded too far so that the amplitude produced by the pulse 42 is not only greater than that produced by 41 but is also greater than the voltage at that time on the cathode of V3A, the voltage on C1 will be increased as indicated at 43 in Fig. 3(c) and this increase is applied through the diode V8, which is then conducting, to the gate valve V7 which is at that time held open by the pulse of Fig. 7(h). The resulting pulse is then applied as a trigger pulse to a transmitter 44 which is then caused to transmit a predetermined response signal. If the pulse 42 occurs before the end of the pulse of Fig. 7(f), although the potential across the capacitor C1 is increased (assuming that the pulse 42 has a larger amplitude than the pulse 41), nevertheless the increase cannot be passed to the valve V7 since the diode V8 is insulating. Moreover the valve V7 is only opened for a short period.

It will be evident that by suitable choice of the durations of the pulses of Figs. 7(f) and (h) and a suitable choice of the tolerances allowed in these durations, it can be arranged that the transmitter 44 is only triggered when two pulses occur at the input of V1 in appropriate predetermined time and amplitude relation.

The time constant of discharge of the capacitor C1 is determined largely by the value of resistor R1 and by making this time constant relatively short the transponder can be made capable of responding to a second interrogation only a short time after it has responded to a first interrogation. In any case this time constant is made short in relation to the recurrence period of the pulse pairs. The tolerance on the duration of the pulses of Figs. 7(f) and (h) may for example be ±0.5 μs. and the circuit may be arranged to respond to pulses occurring within the limits of time determined by these pulses when the amplitude of the second pulse (42) exceeds that of the first (41) by more than 1 db.

It will be understood that from the time, determined by the time constant C1R1, when the capacitor C1 becomes substantially discharged until the occurrence of the first of the next pair of pulses, that is to say during a time not much less than the recurrence period of the pairs of pulses, the transponder is in a condition to respond to pairs of pulses transmitted from other ground stations. Thus the risk of capture of the transponder is small.

The circuits described are also entirely satisfactory from the point of view of side lobe suppression, that is to say the transponder does not respond to transmissions in any direction but that of the main lobe of the directional aerial.

However, the arrangements described suffer from the disadvantage that their maximum range of operation is the range at which the transponder can respond to the first pulse 41 transmitted by the omni-directional aerial.

An arrangement which is responsive over the range of the directional aerial and which nevertheless retains the other advantages mentioned will be described with reference to Figs. 2 and 6.

Referring to Fig. 2, the parts which correspond with parts in Fig. 1 are given the same references as in Fig. 1 but with a dash or two-dash superscript. The triggering pulses from the associated primary radar system are applied at 10′ through a 6 μs. delay circuit 15′ to the 1 μs. pulse generator 11′. They are applied to the 1 μs. pulse generator 16′ through a 16 μs. delay circuit 15″ and also through a buffer amplifier introducing negligible delay. The result is that in response to each triggering pulse there are generated three pulses, the first and last (through 15″ and 45) being radiated from the directional aerial 20′, 22′ and being separated by 16 μs. while the centre pulse is radiated from the omni-directional aerial 24′, 26′ and occurring 6 μs. after the first pulse.

Fig. 6 shows a transponder circuit suitable for use with the ground station of Fig. 2 and Figs. 7(i) to (o) show waveforms present in Fig. 2. The pulses received may have the form shown at Fig. 7(i) the first pulse 46 and the last pulse 47 being of the same amplitude and resulting from radiation from the directional aerial, and the pulse 48 results from radiation from the omni-directional aerial. It is assumed that the range of operation is such that the amplitude of the pulse 48 is less than that of the pulses 46 and 47 which are radiated in the main lobe.

The pulses are applied to the control grid of a triode V9A, which may be one half of a CV858 valve. The inverted and amplified waveform is applied to a cathode follower pentode V10, which may be a 6Ak5 valve, in the cathode circuit of which is a storage capacitor C′1. A diode V11A, which may be one half of a CV140 valve, is connected between C′1 and the cathode of V10.

The first pulse 46 of the set charges the capacitor C′1 and the rise in voltage across the capacitor, shown in Fig. 7(j), and after approximate differentiation in Fig. 7(k), is amplified by a triode V9B, which may be the other half of the CV858 valve, and applied to trigger a multivibrator V12A, V12B, which may be a CV858 valve. When triggered, the multivibrator generates at the anode of V12B a negative-going rectangular pulse 49 shown in Fig. 7(l) of a predetermined duration less than the interval (16 μs.) between the pulses 46 and 47 and greater than the interval (6 μs.) between the pulses 46 and 48. A circuit comprising a crystal rectifier 52 prevents frequency division occurring on the multivibrator when triggered at a high rate. After the end of the pulse 46, the charge on the capacitor C′1 decays at a rate determined by the resistor R′1, as shown in Fig. 7(j).

If the pulse 48 is, as shown, of smaller amplitude than the voltage remaining on the capacitor C′1 when this pulse occurs, it will have no effect on the waveform of Fig. 7(j). If, as shown, the pulse 47 has a greater amplitude than the voltage remaining across the capacitor C′1 at the time of occurrence of this pulse, the waveform of Fig. 7(j) will rise as shown at 53 and the multivibrator will be triggered again to generate a second negative-going pulse 50 (Fig. 7(l)).

A capacitor C2 is charged through a crystal rectifier 51 during the first pulse 49 produced in response to the pulse 46 and at the end of the pulse 49 the potential across the rectifier 51 rises as shown in Fig. 7(m). This potential falls at a rate determined largely by a resistor $R_2$. If the multivibrator is re-triggered before all the charge on C2 has leaked away, the potential across the rectifier 51 falls abruptly. The potential charges across the rectifier are approximately differentiated to produce the waveform of Fig. 7(n) and a diode V11B, which may be the second half of the CV140 valve, passes only the negative-going parts of this waveform, shown in Fig. 7(o) to trigger the transmitter 44′.

At close ranges in directions corresponding to the side lobes 29 of Fig. 4 and not the main lobe 23, the amplitude of the pulse 48 will, as shown in broken lines in Fig. 7(i), exceed that of the pulses 46 and 47 and will produce the effects shown in broken lines in Fig. 7(j) to (o). Thus the multivibrator will not be re-triggered because no trigger pulse is applied to it.

As in the case of the transponder of Fig. 5 the constants and tolerances are suitably chosen to give to the system the required selectivity as to relative pulse amplitudes and the relative timing of pulses. Thus, for example, the storage circuit C′1R′1 may be arranged to discharge linearly at a predetermined rate equivalent to 0.4 db/μs. approximately so that in the absence of a control pulse 48 the storage circuit will have decayed the equivalent of 6 db at the time of reception of the second interrogator pulse 47. The transmitter is arranged to be triggered if a rise on the storage circuit equivalent to more than 1 db is produced at the time of reception of the second interrogator pulse 47, so that triggering occurs provided the first interrogator pulse 46 does not exceed the second interrogator pulse 47 by more than 5 db. When a control pulse 48 is also received it too will add charge to the storage circuit if its amplitude is greater than the charge remaining on the capacitor C′1 from the first interrogator pulse 46. The circuit constants are so chosen that the control pulse 48 has no effect upon the timing and gate circuits. During the 9 microsecond interval between the trailing edge of the control pulse 48 and the leading edge of the second interrogator pulse 47 the storage circuit will decay the equivalent of 4 db, so that if the control pulse 48 exceeds the second interrogator pulse 47 by more than 3 db the transmitter will not be triggered. It should be noted that the transponder of Fig. 6 designed to operate with the three pulse method of ground transmission of Fig. 2 will also operate with a two pulse method of ground transmission of Fig. 1 if, as described, the first pulse 41 is made the control pulse and if the interrogator pulse 42 is arranged to be transmitted 16 microseconds after the first pulse instead of 10 μs. as described.

We claim:

1. A transponder for use in a secondary radar system employing recurrent pairs of pulses of radio frequency energy, said transponder including a radio transmitter and a radio receiver for receiving said pulses at an input thereof, said radio receiver comprising a charge storage means, means coupling said input to said charge-storage means to apply each of said first pulses to said charge storage means, a discharge circuit for said storage means, suppression means in said discharge circuit responsive to said first pulses to render said discharge circuit inoperative for a first predetermined time interval after each actuation thereof, gating means, means coupling said input to said gating means, means coupling said suppression means to said gating means to open said gating means for a second predetermined time interval following each of the said first time intervals, said second time intervals including the times of occurrence of said second pulses at said gating means, whereby said second pulses can pass to the output of said gating means, and means coupling said output to said transmitter to render said transmitter operative when said second pulses pass through said gating means.

2. A transponder according to claim 1, wherein said charge storage means comprises means responsive to a predetermined amplitude relation between said second pulse and said first pulse to apply said second pulse from said input to said gating means only when said predetermined amplitude relation exists.

3. A transponder for use in a secondary radar system employing recurrent sets of at least two pulses of radio frequency energy, said transponder including a radio transmitter and a radio receiver for receiving said pulses at an input thereof, said radio receiver comprising a first charge storage means, a circuit discharging said charge storage means at a predetermined rate, control pulse generating means coupled to said charge storage means and responsive to an increase in voltage across said charge storage means to generate a control pulse having a duration shorter than the time between the first and last pulse of each said set, means coupling said input to said charge storage means, a second charge storage means, means coupling said control pulse generating means to said second charge storage means to generate a control voltage across said second charge storage means at the end of said control pulse, a circuit discharging said second charge storage means at a predetermined rate, a triggering pulse generator responsive to one of said control pulses only when the said control voltage exceeds a predetermined value to generate a triggering pulse, and means coupling said triggering pulse generator to said transmitter to actuate said transmitter in response to a triggering pulse.

4. A transponder according to claim 3, wherein the number of pulses in each said set is three, and wherein the duration of said control pulse is greater than the time between the first and second pulse of each said set.

References Cited in the file of this patent
UNITED STATES PATENTS

| | | |
|---|---|---|
| 2,444,426 | Busignies | July 6, 1948 |
| 2,594,916 | Gulnac | Apr. 29, 1952 |
| 2,606,282 | Lipkin | Aug. 5, 1952 |
| 2,624,873 | Bess | Jan. 6, 1953 |